March 22, 1960 R. M. TUCK ET AL 2,929,478
TRANSMISSION CONTROL SYSTEM
Filed June 11, 1957
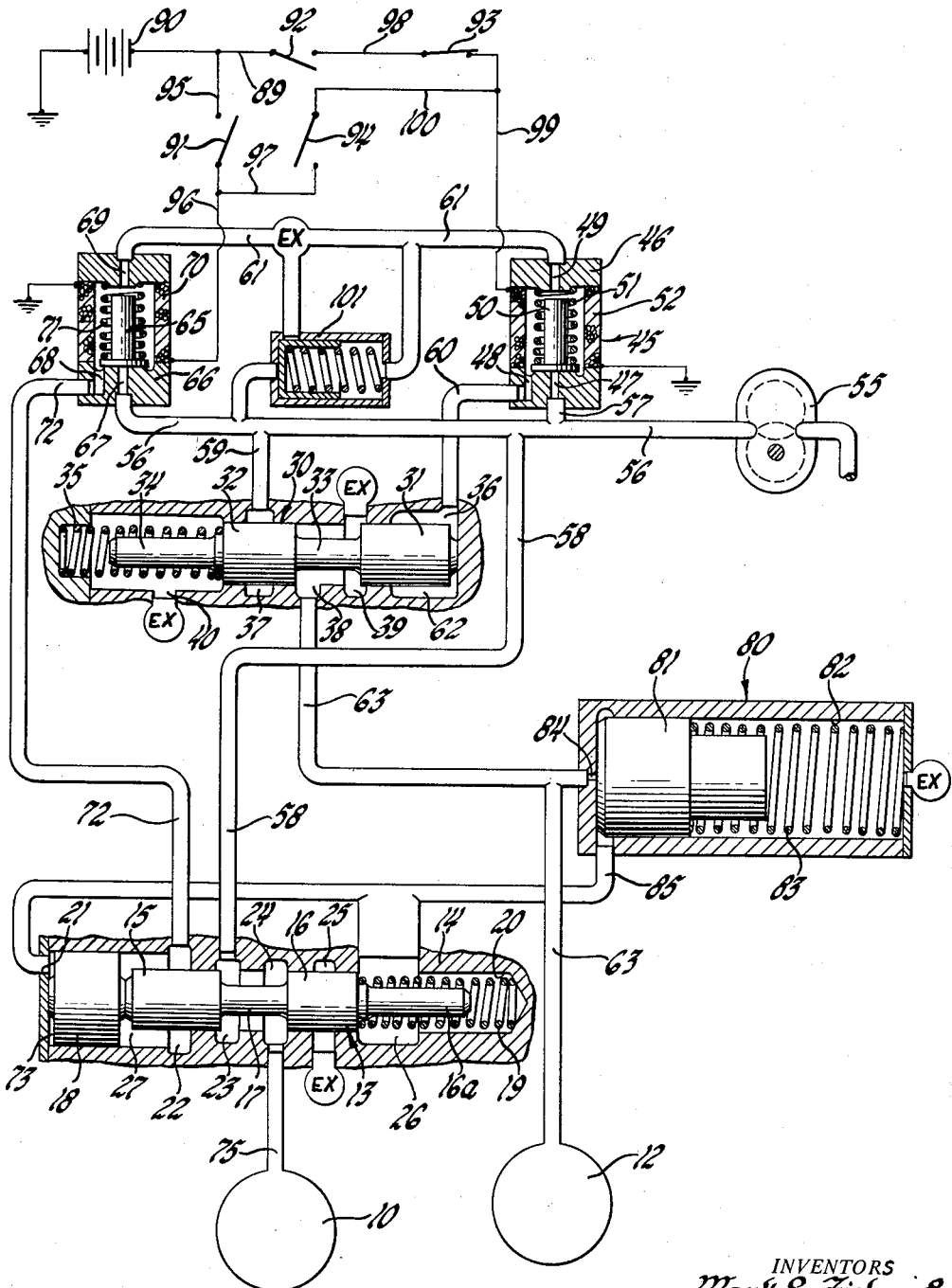
INVENTORS
Mark E. Fisher &
BY Robert M. Tuck
W. C. Middleton
ATTORNEY

United States Patent Office 2,929,478
Patented Mar. 22, 1960

2,929,478

TRANSMISSION CONTROL SYSTEM

Robert M. Tuck, Indianapolis, and Mark E. Fisher, Carmel, Ind., assignors to General Motors Corporation, Detroit, Mich., a corporation of Delaware Application June 11, 1957, Serial No. 664,969

6 Claims. (Cl. 192—87)

This invention relates to transmission control systems and more particularly to a control system for a transmission of the type having different clutches adapted to be operated selectively or simultaneously to provide different conditions of operation. A transmission of this type is shown and described in the application for United States Letters Patent of Hans Schjolin and Mills Parshall, Serial Number 592,935, now Patent No. 2,889,718 and, accordingly, the transmission details need not be repeated herein. The transmission to which the control system of the present application applies is of the type which includes a pair of clutches which may be actuated selectively to provide drive through a hydrodynamic torque converter or direct mechanical drive, or may be actuated jointly to provide engine braking.

An object of this invention is to provide a relatively simple control system for a transmission of the type having a pair of clutches adapted to be selectively engaged to provide torque transfer through different torque paths or to be engaged simultaneously to provide overrun vehicle braking.

Another object of this invention is to provide a control system for a transmission of the type having one clutch adapted to be engaged for drive through a hydrodynamic torque converter and a second clutch adapted to be engaged for direct drive independent of the torque converter wherein a fluid pressure controlled shift valve is effective to control each clutch, respectively, and wherein the converter clutch shift valve is movable in response to fluid pressure under control of the direct drive clutch shift valve in the direct drive position thereof to release the converter clutch.

A further object of this invention is to incorporate in a control system of the class described, a shift valve for controlling one clutch, a shift valve for controlling a second clutch, a passage connecting said second-mentioned valve to the clutch controlled thereby and to a pair of control chambers associated with said first-mentioned valve to control the position of said second mentioned valve in accordance with pressure obtaining in said second clutch.

These and other objects and advantages of this invention will be apparent from the following specification and claims taken in conjunction with the drawing which is a schematic diagram of a control system constructed in accordance with the principles of the invention.

Referring to the figure there is shown schematically a control system embodying the principles of this invention for controlling the admission of fluid pressure to and exhaust of fluid under pressure from a pair of clutches 10 and 12. Clutch 10 is adapted to drive an impeller (not shown) of a hydrodynamic torque transmitting mechanism such as, for example, a hydraulic torque converter or a fluid coupling. Clutch 12 may be engaged and clutch 10 released to provide direct mechanical drive independent of the hydraulic torque converter. Both clutches 10 and 12 may be simultaneously engaged to provide overrun engine and hydrodynamic braking particularly useful in descending long grades.

A pair of fluid pressure controlled shift valves indicated generally at 13 and 30 control the admissoin of fluid pressure to and exhaust of pressure from clutches 10 and 12 respectively. Converter clutch shift valve 13 is disposed in a valve body 14 and includes a pair of lands 15 and 16 of equal diameter joined by reduced stem 17, there being an additional stem or stop member 16a at one end of land 16. A valve plug 18 of greater diameter than land 15 contacts land 15 for a purpose hereafter more fully explained. A spring 19 in a chamber 20 yieldably biases valve 13 and plug 18 to the left hand position illustrated. Six ports 21, 22, 23, 24, 25 and 26 are associated with the converter clutch shift valve 13 for purposes hereafter more fully explained.

Direct clutch control shift valve 30 is composed of a pair of lands 31 and 32 joined by a reduced stem section 33, there being an additional stem or stop member 34 carried by land 32. A spring 35 yieldably biases valve 30 to its right hand position illustrated. A series of five ports, 36, 37, 38, 39 and 40 are associated with valve 30 for purposes hereafter more fully explained.

A solenoid valve indicated generally at 45 includes a housing 46 having ports 47, 48 and 49. A valve member 50 is normally biased by a spring 51 to block off port 47 and to connect port 48 to port 49. A solenoid 52, when energized, is effective to move valve 50 to block off port 49 and to connect port 47 to port 48.

A fluid pressure source, such as an engine driven pump 55 delivers fluid under pressure to a passage 56 and to branch passages 57, 58 and 59. Branch passage 57 connects to supply port 47 of valve 45, the port being normally blocked by valve 50 whenever solenoid 52 is deenergized. Port 49 exhausts to sump through a passage 61. Port 48 connects to a passage 60 leading to a chamber 62 of direct clutch shift valve 30. As will readily be understood, when solenoid 52 is deenergized, spring 51 is effective to position valve 50 as shown, such that line pressure supply passage 57 is blocked off at port 47. The direct clutch signal passage 60 is connected to exhaust by way of ports 48, 49 and passage 61. When solenoid 52 is energized, spring 51 is compressed and valve 50 is positioned to admit fluid under pressure from passage 57 to direct clutch signal passage 60.

A second solenoid valve 65 may be positioned to control the converter clutch valve 13 to establish neutral when desired. Normally, solenoid valve 65 is deenergized and when in this condition blocks off pressure supply passage 56 from passage 72 and connects passage 72 to exhaust. Valve 65 is similar to direct clutch solenoid valve 45 in structure and includes a housing 66 having ports 67, 68 and 69 therein. Valve member 65 is normally spring biased by a spring 71 to block off port 67 and to connect port 68 to exhaust port 69. A solenoid 70 may be energized to move valve 65 against spring 71 to block off port 69 and to connect ports 67 and 68. Fluid under pressure is thereupon admitted from passage 56 to a neutral clutch signal passage 72. Passage 72 connects to a control chamber 27 of converter clutch control valve 13 by way of port 22. When neutral solenoid valve 65 is energized to admit line pressure from passage 56 to passage 72, this pressure acting in chamber 27 is operative on the end of land 15 to move valve 13 against spring 19 so that port 23 is blocked off by land 15 and converter clutch supply passage 75 is connected to exhaust by way of port 24 and exhaust port 25. Normally, spring 19 positions valve 13 to connect passage 58 to passage 75 by way of ports 23 and 24. A manually operable switch 91 may be closed or opened by the vehicle operator to establish neutral or initial drive through converter clutch 10.

As heretofore explained, when direct drive solenoid 52 is energized, fluid pressure is admitted from passage 57 to passage 60, this pressure being admitted to a control chamber 62 of valve 30 through port 36. In the absence of fluid pressure in control chamber 62, a spring 35 acting upon land 32 of valve 30 positions the valve as shown such that land 32 is effective to block off port 37, and passage 63 is connected to exhaust by way of ports 38 and 39. When fluid under pressure is admitted to chamber 62, spring 35 is compressed and pressure from passage 59 is admitted to passage 63 by way of ports 37 and 38. An accumulator 80 is made up of a piston 81 in a cylinder 82, there being a spring 83 acting on one side of piston 81. Passage 63 is connected to the accumulator through a restriction 84. Cylinder 82 is connected by way of a passage 85 to a pair of spaced control chambers associated with converter clutch shift valve 13. Pressure from passage 85 is admitted to spring chamber 20 by way of port 26. Pressure from passage 85 is also admitted to a control chamber 73 at one end of the relatively large direct signal plug 18 by way of port 21.

The arrangement of accumulator 80, restriction 84 and control of the converter clutch shift valve is such as to provide smooth shift from converter drive to direct drive with torque overlap. Assuming that the vehicle is operating in converter drive, the valve 13 will be positioned as illustrated. Now, assume that direct clutch control shift valve 30 is positioned to call for a shift from converter drive to direct drive thereby admitting line pressure to passage 63. Fluid under pressure will be admitted to direct drive clutch 12 through passage 63. This pressure will quickly move the clutch friction surfaces into initial friction contact, but not with sufficient pressure to carry the entire load. After this initial contact of the clutch friction surfaces, the rate of pressure build up in the direct drive clutch 12 is determined by the accumulator 80 in conjunction with fixed restriction 84. As the accumulator spring is compressed, the pressure in passage 63 increases. This assures initial frictional contact of the clutch plates under relatively light pressure with a gradually increasing pressure effective to cause the clutch plates to smoothly pick up the load becoming effective after the initial engagement of the clutch plates.

It will be noted that the accumulator 80 is connected by a passage 85 to a pair of control chambers 20 and 73 to control the converter clutch control valve 13. Pressure in chamber 20 acts in assistance to spring 19 to bias valve 13 to the position shown wherein fluid pressure is admitted to converter clutch 10. Pressure in chamber 73 acts upon the end of direct drive signal plug 18 and tends to move valve 13 to exhaust fluid from converter clutch 10. Fluid pressure is admitted to chamber 20 to delay movement of valve 13 so that the converter clutch 10 is not connected to exhaust until such time that the pressure acting upon the direct drive clutch is of sufficient magnitude to enable the direct drive clutch to carry the load. When such a condition exists, valve 13 is moved to connect clutch 10 to exhaust, thereby releasing the converter drive clutch.

In order to establish a positive neutral wherein the engine may be raced without driving the vehicle, the converter clutch control valve 13 may be positioned to connect converter clutch 10 to exhaust by energizing solenoid valve 65.

The electrical system for controlling valves 65 and 50 includes a battery 90, a neutral switch 91, a governor switch 92, overrule switch 93, and a converter braking switch 94. Battery 90 is connected to governor switch 92 and to neutral switch 91 by means of conductor 89 having a branch 95. Switch 91 is connected to neutral solenoid 70 by means of a conductor 96. A branch conductor 97 connects neutral solenoid valve 70 to a converter braking switch 94. A conductor 98 connects governor switch 92 to an overrule switch 93. Switch 93 is connected to direct solenoid 52 by means of conductor 99; there being a conductor 100 extending between conductor 99 and converter braking switch 94. Neutral switch 91 may be operable by the vehicle operator to select neutral when desired. It may be automatically operated by a transmission gear shift lever to automatically be closed during the shift interval wherein change of drive ratio is accomplished, and automatically opened upon completion of change of drive ratio. Governor switch 92 is actuated by a governor responsive to vehicle speed and is adapted to close at a predetermined vehicle speed, for example, 18 miles per hour, and to automatically open at speeds below the predetermined speed. Overrule switch 93 is normally closed, but may be opened by depressing the accelerator pedal (not shown) beyond wide open throttle position. Converter braking switch 94 is normally open, but may be closed at any time by the vehicle operator. A line pressure regulator valve 101 maintians the pump pressure at a predetermined maximum pressure.

*Operation*

With the vehicle standing still, with neutral solenoid valve 65 deenergized, converter clutch control valve 13 is effective to deliver pump pressure from passage 58 to passage 75 to engage the converter drive clutch 10. With the engine at idle speed the converter impeller (not shown) will be driven by clutch 10, but due to internal slip in the converter, the vehicle will not be driven. By increasing the engine speed, the vehicle will be driven through the torque converter until it reaches the speed at which governor switch 92 is closed, for example 18 miles per hour. Governor switch 92 when closed, causes direct clutch solenoid 52 to be energized, thereby admitting pump pressure from passage 57 to passage 60. This pressure in chamber 62 moves direct clutch control valve 30 to admit pump pressure from passage 59 to passage 63 to apply direct drive clutch 12. The accumulator 80 provides for smooth pick up of the load by the direct drive clutch by regulating the pressure rise in the direct drive clutch. In addition, accumulator 80 delays the release of the converter clutch until sufficient pressure is built up in the direct drive clutch to carry the load. When clutch 12 is engaged, pressure in chamber 73 acting upon signal plug 18 moves converter clutch control valve 13 to connect passage 75 to exhaust by way of ports 24 and 25 to release the converter drive clutch. The transmission is now in direct drive. In the event that the vehicle speed drops below the predetermined upshift speed, governor switch 92 will open, thereby deenergizing direct drive solenoid valve 50. Valve 50 will thereupon connect passage 60 to exhaust passage 61, enabling spring 35 to move valve 30 to connect passage 63 to exhaust by way of ports 38 and 39. Release of pressure in passage 63 results in release of pressure in passage 85. Spring 19 thereupon moves valve 13 to admit pump pressure to converter drive clutch 10 by way of ports 23 and 24. The vehicle is now driven through the torque converter.

A forced downshift from direct drive to converter drive may be had at speeds above the governor upshift speed when desired. Overrule switch 93 in series with governor switch 92 may be opened by depressing the accelerator pedal, not shown, past its wide-open throttle position. If this is done, the valve action is the same as that described in connection with the opening of governor switch 92. It will be apparent that so long as the vehicle speed remains sufficiently high to cause the governor switch to be closed, that the operator may change from direct drive to converter drive by movement of the accelerator pedal past its full throttle position.

In the event that the operator wishes to use the torque converter for vehicle braking when the vehicle speed is high enough to keep the governor switch 92 closed, the operator may close the converter braking switch 94 to energize neutral solenoid 70. Solenoid valve 65 thereupon admits fluid under pressure from passage 56 to passage 72, this pressure being operable in chamber 27 to oppose the action of fluid pressure in chamber 73 acting upon plug 18. With the direct drive clutch engaged, fluid pressure in chamber 20, and spring 19 tend to position valve 13 to admit pressure from passage 58 to passage 75. Pressure in chamber 73 acting on plug 18 moves valve 13 to connect passage 75 to exhaust port 25. When, however, converter brake switch 94 is closed, pressure is admitted from passage 56 to passage 72 and to chamber 27. This pressure in chamber 27 acting upon plug 18 counteracts the effect of pressure in chamber 73 acting upon plug 18. Pressure in chamber 20 plus spring 19 are thereupon effective to position valve 13 to connect passage 58 to passage 75 to apply the converter impeller drive clutch 10. With both the direct drive clutch and converter drive clutch engaged at the same time, the torque converter, impeller and turbine rotate together for overrun hydrodynamic braking in the converter. Thus, in this condition of operation there is provided both direct engine braking and hydrodynamic braking in the converter when the vehicle tends to overrun the engine.

What is claimed is:

1. In a control system for controlling a pair of transmission clutches, a fluid pressure source, a first shift valve for controlling one of said clutches connected to said one clutch and connected to said source of fluid pressure, means yieldably biasing said first shift valve to admit fluid pressure from said source to said one clutch to apply the same, a pair of control chambers associated with said shift valve, a second shift valve connected to said fluid pressure source, a passage between said second shift valve and the second of said pair of clutches, an additional passage connecting said first-mentioned passage and said pair of control chambers in parallel, means yieldably biasing said second shift valve to connect both of said last-mentioned passages to exhaust, a control chamber associated with said second mentioned shift valve, valve means normally effective to connect said last-mentioned control chamber to exhaust and movable to admit fluid pressure from said source to said last-mentioned control chamber, said second-mentioned shift valve being movable in response to fluid pressure in said last-mentioned control chamber to connect both of said passages to said fluid pressure source, said first-mentioned shift valve being movable in response to fluid pressure in the control chambers associated therewith to connect said first-mentioned clutch to exhaust only after engagement of said second-mentioned clutch, a third control chamber associated with said first-mentioned shift valve, an additional valve for controlling admission of fluid pressure from said source to said third control chamber, means yieldably biasing said additional valve to connect said third control chamber to exhaust, and manually controllable means for positioning said additional valve to admit fluid under pressure from said source to said third control chamber, said first-mentioned shift valve being movable in response to fluid pressure in said third control chamber to connect said first-mentioned clutch to exhaust.

2. In a control system for controlling a pair of transmission clutches, a fluid pressure source, a first shift valve for controlling one of said clutches connected to said one clutch and to said fluid pressure source, means yieldably biasing said shaift valve to admit fluid pressure to said clutch to engage the same, a second shift valve connected to said fluid pressure source and to the other of said clutches, means yieldably biasing said second shift valve to connect said second clutch to exhaust to release the same, a pair of control chambers associated with said first shift valve and connected for control by said second shift valve, means for positioning said second shift valve to direct fluid pressure to said second clutch to engage the same and to said pair of control chambers, said first shift valve being movable in response to fluid pressure in said control chambers to connect said first clutch to exhaust to release said first clutch, a third control chamber associated with said first shift valve adapted to receive fluid pressure to bias said first shift valve toward a position to connect said first-mentioned clutch to exhaust, a manually controllable valve for controlling the admission of fluid pressure to said third control chamber, said first shift valve being responsive to fluid pressure in said third control chamber to connect said first clutch to exhaust for neutral operation whenever said pair of control chambers associated with said first shift valve are connected to exhaust, said first shift valve being effective upon admission of fluid under pressure to all three control chambers associated therewith to connect said first clutch to said fluid pressure source for engagement of said first clutch.

3. In a control system for controlling a pair of transmission clutches, a fluid pressure source, a first shift valve for controlling one of said clutches connected to said clutch and said fluid pressure source, means yieldably biasing said shift valve to admit fluid pressure to said clutch to engage the same, first, second and third control chambers associated with said shift valve, a second shift valve for controlling the admission of fluid pressure from said source to the second of said clutches and to said first and second control chambers, means yieldably biasing said second shift valve to connect said second clutch and said first and second control chambers of said first shift valve to exhaust, means for positioning said second shift valve to direct fluid pressure to said second clutch to engage the same and to said first and second control chambers, said first shift valve being movable in response to fluid pressure in said first and second control chambers to release said first clutch, said first shift valve being movable responsive to fluid pressure in said third control chamber when said first and second control chambers are connected to exhaust to connect said first clutch to exhaust for neutral operation, said first shift valve being effective upon admission of fluid pressure to all three control chambers to admit fluid pressure to said first clutch to engage the same, and additional valve means for controlling the admission of fluid pressure from said source to said third control chamber of said first shift valve.

4. A control system as set forth in claim 3 including a restriction and an accumulator positioned between said second shift valve and the first and second control chambers of said first shift valve for regulating the rate of pressure build up and discharge of pressure from said first and second control chambers.

5. A control system as set forth in claim 3 wherein said second shift valve is connected to said second clutch for admission of fluid pressure to and exhaust of pressure from said second clutch without restriction, and including a passage in parallel with the connection between said second shift valve and said second clutch connected to said first and second control chambers of said first shift valve and provided with a restriction and an accumulator for controlling the rate of fluid pressure build-up in and discharge of fluid pressure from said first and second control chambers.

6. In a control system for controlling a pair of transmission clutches, a fluid pressure source, a first shift valve for controlling one of said clutches connected to said source and said one clutch, spring means yieldably biasing said first shift valve to admit fluid pressure from said source to said one clutch to engage the same, a pair of control chambers associated with said first shift valve adapted to receive fluid under pressure, the pressure admitted to one of said control chambers being effective to assist said spring and the pressure in the other of said control chambers being effective to oppose said spring, a second shift valve connected to said fluid pressure source for controlling the admission of fluid pressure to said pair of control chambers and to the second of said pair of clutches, a passage connecting said second shift valve to said second clutch, a branch passage connecting said first-mentioned passage to the pair of control chambers associated with said first-mentioned shift valve, a restriction and an accumulator in said branch passage for delaying the rate of rise of pressure in said pair of control chambers associated with said first shift valve upon admission of fluid pressure to said second clutch by said second shift valve, spring means yieldably biasing said second-mentioned shift valve to connect both said first-mentioned passage and said branch passage to exhaust, a control chamber associated with said second-mentioned shift valve, a third valve normally effective to connect said last-mentioned control chamber to exhaust and movable to admit fluid pressure to said last-mentioned control chamber, control means for controlling the action of said third valve, the pressure in said pair of control chambers associated with said first shift valve being effective to move said first shift valve to release said first clutch only after engagement of said second clutch, a third control chamber associated with said first-mentioned shift valve, an additional valve for controlling the admission of fluid pressure to and exhaust of pressure from said third control chamber, said first-mentioned shift valve being movable in response to fluid pressure in said third control chamber to connect said first-mentioned clutch to exhaust, and manually operable means for controlling the position of said additional valve.

References Cited in the file of this patent

UNITED STATES PATENTS

| | | |
|---|---|---|
| 2,376,545 | Livermore | May 22, 1945 |
| 2,464,986 | Miller | Mar. 22, 1949 |
| 2,505,450 | Wemp | Apr. 25, 1950 |
| 2,693,260 | Lucia | Nov. 2, 1954 |
| 2,738,689 | Dodge | Mar. 20, 1956 |
| 2,775,330 | Schjolin | Dec. 25, 1956 |
| 2,788,678 | Sheppard | Apr. 16, 1957 |
| 2,794,349 | Smirl | June 4, 1957 |
| 2,833,162 | Forster | May 6, 1958 |